United States Patent Office 3,046,255
Patented July 24, 1962

3,046,255
PROCESS FOR PREPARING POLYCARBONATES
Franklin Strain, Barberton, and Henry C. Stevens, Akron, Ohio, and George E. Foltz, Pittsburgh, Pa., assignors, by mesne assignments, to Pittsburgh Plate Glass Company
No Drawing. Filed June 20, 1957, Ser. No. 667,037
12 Claims. (Cl. 260—77.5)

This invention relates to the preparation of high molecular weight polycarbonates. More particularly, it deals with the preparation of such polycarbonates from acid halides of a carbonic acid and hydroxylic compounds.

It has been discovered that high molecular weight polycarbonates having a multiplicity of carbonate linkages in their molecules are prepared most advantageously from acid halides of a carbonic acid and hydroxylic compounds in a heterogeneous liquid reaction medium containing a liquid aqueous alkaline phase and an inert, essentially water insoluble organic phase, the organic phase being comprised of a component other than the reagents or products. This inert organic phase is so constituted, as by the presence of a partially halogenated hydrocarbon, that it is capable of dissolving the high molecular weight polycarbonates. It is thus the organic phase of the heterogeneous reaction medium which at the conclusion of polycarbonate formation contains dissolved therein product polycarbonate.

As a consequence of employing a heterogeneous reaction medium in accordance with this invention, various benefits are realized. Yields are favorably influenced, often quite strikingly. Separation and recovery of the polycarbonate product is greatly facilitated. Even the character of the product may be influenced beneficially.

An important consideration in the performance of this invention is the composition of the organic phase of the heterogeneous reaction medium. Solvents employed to provide the organic phase of the heterogeneous reaction medium should be inert, essentially water insoluble and a good solvent for the products. By inert is meant inability to react chemically under the reaction conditions with other materials present in the medium. Organic solvents which are free from reactive hydroxyl or amino groups are inert within the intended meaning. Solvents such as chloroform, methyl chloride, methylene chloride, ethylene chloride, $\beta,\beta'$-dichloroethyl ether, ethylidene dichloride, dichloroethylene and the dichlorobutanes typify suitable partially chlorinated solvents. Such partially chlorinated hydrocarbons which are partially chlorinated aliphatic hydrocarbons containing 1 to 4 carbon atoms having at least 1 carbon atoms linked to both a hydrogen atom and a chlorine atom are especially suited. Other solvents include nitroalkanes, e.g. nitromethane, the incompletely water soluble dialkyl ethers such as diethyl ether and isopropyl ether.

Aqueous alkaline phases of the heterogeneous medium are usually aqueous solutions of water soluble alkaline materials or aqueous dispersions of water insoluble or sparingly water soluble, alkaline materials. Used with most efficiency are inorganic alkaline materials, especially those which are hydrogen halide acceptors. Among the useful inorganic alkaline materials are the oxides, hydroxides, and carbonates of sodium, potassium, calcium, barium, strontium, and magnesium or other alkaline earth metal or alkali metal may be employed. In the case of water soluble alkaline materials such as sodium hydroxide, concentrated solutions such as those containing on the order of 40 to 60 percent by weight of sodium hydroxide are most frequently used. On the other hand, with water insoluble alkaline materials such as calcium carbonate, dispersions of finely divided particles of calcium carbonate in water are useful. Those inorganic alkaline materials which upon reaction with hydrogen chloride provide water soluble salts are most satisfactory, for example, sodium hydroxide.

Sufficient alkaline material is included in the aqueous phase to insure the conversion of hydrogen chloride or like halogen halide evolved by the reaction to an inert and usually neutral salt. The aqueous phase is dilute enough to dissolve the salts thus produced or at least permit a manageable medium.

This heterogeneous reaction medium is usefully employed in the formation of numerous high molecular weight polycarbonates from acid halides of a carbonic acid, most notably the acid chlorides of a carbonic acid, and hydroxylic compounds among which the most prominent are diols (dihydric compounds). In this formation, a plurality of these acid chloride radicals and a plurality of the hydroxyl groups are consumed (and in effect, directly or indirectly reacted) to provide high molecular weight polycarbonate molecules containing a multiplicity of carbonate linkages. One such reaction occurs from a bis-haloformate of a diol and a diol. Hydrogen halide corresponding to the acid halide radical is generated in this formation of the carbonate linkage. However, no free hydrogen halide is observed. The aqueous alkaline phase serves to bind chemically the hydrogen halide as a halide salt, usually a neutral salt such as sodium chloride.

High molecular weight polycarbonates of varying physical properties are prepared from acid chlorides of a carbonic acid and hydroxylic compounnds in accordance with this invention by the use of the specified heterogeneous reaction medium. It will be appreciated that the properties of the high molecular weight polycarbonates are governed by the particular acid chlorides of carbonic acid and hydroxylic compounds from which they are derived. Effecting polycarbonate formation in the heterogeneous reaction medium containing an aqueous alkaline phase and an inert, essentially water insoluble organic phase is beneficial to polycarbonate formation in general from acid chlorides of a carbonic acid and hydroxylic compounds.

Among the acid chlorides of a carbonic acid which are suitably employed for the formation of high molecular weight polycarbonate compositions are carbonyl chloride (phosgene), chloroformates (chlorocarbonates) most useful of which are the bis-chloroformates and chloroformates having both the acid chloride radical and an active hydroxylic group. Acid chlorides of a carbonic acid are most frequently used and constitute the preferred acid halides. They are generally least costly, most readily prepared and handled with greatest facility. However, other acid halides of a carbonic acid such as carbonyl bromides and bis-bromoformates or other bis-haloformates are capable of use.

Hydroxylic compounds used in conjunction with the heterogeneous medium in the formation of high molecular weight polycarbonates are most appropriately diols, e.g., organic compounds having two reactive hydroxylic groups. Widely diversified diols are useful in the preparation of high molecular weight polycarbonates. Aliphatic diols, notably saturated and olefinically unsaturated glycols such as ethylene glycol, diethylene glycol, and erythrol, aralkyl diols such as the xylylene glycols, aromatic glycols including resorcinol are among those hydroxylic compounds suited for formation of polycarbonates. In some instances, monohydroxylic compounds which also contain an acid chloride radical are also appropriate. It will be understood that particularly with aromatic diols such as resorcinol the corresponding phenates may be the actual form of the hydroxylic compounds in the heterogeneous medium, especially when the aqueous alkaline phase is an aqueous sodium hydroxide alkaline solution.

In the formation of high molecular weight polycarbonates, for example, diethylene glycol dichloroformate or similar polychloroformates and a diol are reacted in the heterogeneous medium by recourse to a variety of expedients. Both reactants may simply be incorporated in a medium containing both an aqueous alkaline phase and an inert organic phase. Other means for establishing the heterogeneous medium and conducting the reaction therein may be employed. Sequential introduction first of the diol followed by addition of the polychloroformate to the heterogeneous medium is a favored procedure, especially when the rate of chloroformate addition is so controlled that the reaction is in progress during at least a major portion, e.g. at least 50 percent of the addition.

Besides sequentially or otherwise introducing both reactants into the heterogeneous medium, the process contemplates introduction of the required aqueous alkaline phase to a medium containing the inert solvent, dichloroformate and diol. By controlling the rate at which the alkaline material is so added, the rate of reaction may be controlled. Among other things, this facilitates temperature regulation. It has been found advantageous, for example, to spray or jet the aqueous alkaline material into the medium. Also, the organic phase of the requisite heterogeneous medium may be provided at a period subsequent to the commencement of, but prior to the conclusion of the reaction.

A combination of the above described expedients for conducting the reaction in accordance with this invention is frequently utilized by initially providing a medium containing the diol and the inert organic solvent for the product polycarbonate. Then, the addition of polychloroformate as well as an aqueous alkaline medium is commenced, usually with independent but simultaneously introduced streams of the respective materials being charged. Correlation of these two feeds to insure presence of adequate quantities of the alkaline material is recommended.

The aqueous phase is so constituted as to contain alkaline material in sufficient quantities to insure conversion of the hydrogen chloride evolved as a consequence of the reaction to an inert and usually neutral salt. Thus, each mole of dichloroformate entering into the polycarbonate formation will result in the theoretical evolution of 2 moles of hydrogen chloride. Consequently, at least about 2 mole equivalents of alkaline material per mole of dichloroformate undergoing reaction is required. Of course, when the polychloroformate is not completely converted, as when the reaction is not conducted to completion or when there is less diol than stoichiometrically required to react with the polychloroformate, the quantity of alkaline material required may be varied accordingly.

Complete and efficient polycarbonate formation by reaction of a bis-chloroformate and a diol is achieved by using between about 2.2 and 4.0 moles of alkaline material per mole of dichloroformate. Thus, between about 2.2 and 4.0 moles of sodium hydroxide, or equivalent alkaline material, is normally employed per mole of dichloroformate. That is, a stoichiometric excess of alkaline material is employed to assure the presence of terminal hydroxyl groups in the linear polycarbonate. Although not essential, even larger amounts of alkaline material may be employed.

The relative amount of water in the aqueous phase of the heterogeneous medium is variable. Sufficient water is usually present to permit solution of the water soluble alkaline material, when water soluble alkaline materials are chosen. Appropriately, the aqueous phase should be sufficiently dilute to provide an agitatable slurry of the by-product salt resulting from reaction of the evolved hydrogen chloride and alkaline material. With sodium hydroxide as the alkaline material, between about 2 to 6 moles of water per mole of sodium hydroxide is suitable and preferred. Although wide variations in the water content of the aqueous phase are permissible, the water solubility of the diol reactant generally makes it advisable to use only minimum quantities of water in an effort to minimize the losses of the diol which might be encountered due to such solubility.

Although it might be expected that each hydroxyl group of the diol would react with one chloroformate radical of the polychloroformate and that quantities of reactants should be employed with such in mind, use of mole equivalents of the respective reactants does not necessarily provide the best yields. For example, in the reaction of diethylene glycol dichloroformate and diethylene glycol, optimum yields of polycarbonate have resulted when somewhat less diethylene glycol is present than dichloroformate on a mole basis. With between about 1.1 to 1.3 moles of diethylene glycol dichloroformate per mole of diethylene glycol, maximum conversions to polycarbonate based on the dichloroformate consumption are achieved. Therefore, between about 1.1 and 1.3 chloroformate groups per hydroxyl group of the diol preferably are employed.

Polycarbonate formation in this process is reasonably exothermic and unless provision is made for the removal of this heat of reaction, undesirable reaction temperatures are encountered inasmuch as the reaction should be conducted at temperatures which are normally below about 70° C. and above the temperature at which substantial freezing of the reactants and reaction medium is encountered. Temperatures above about minus 10° C., notably about 0° C. to about 40° C. are most frequently employed. External cooling such as is provided by contacting the outer surfaces of the reaction container with a coolant satisfactorily provides this temperature control. Other cooling techniques may also be used.

At the conclusion of the reaction, a medium exists which is composed of an aqueous, inorganic phase as well as an organic-product containing phase. The aqueous portion is in the form of a thick salt sludge and may contain some unused alkaline material; the salt is present by virtue of reaction between the alkaline material and evolved hydrogen chloride. In the organic phase is the polycarbonate, solvent and possible unreacted starting reagents.

Recovery of the polycarbonate from such medium is possible by several expedients. In one, phase separation of the organic phase is followed by a simple atmospheric and sub-atmospheric distillation to remove the solvent. Polycarbonates thusly recovered usually have the highest possible hydroxyl numbers for a given preparation.

Prior to removal of solvent by distillation, the organic phase may be washed, with aqueous media usually water or dilute aqueous alkali or acids. Usually, polycarbonates thusly recovered have lower hydroxyl numbers than those provided by omitting the washing.

Along with such washing procedures, it is often advantageous to insure the absence of chloroformate end groups and complete the reaction. This may be accomplished by incorporating pyridine, tertiary amines such as triethylamine and alkaline materials such as sodium hydroxide in the wash.

The diol reactant is usually water soluble so that the aqueous component of the reaction medium often contains some unreacted diol, or in the case of aromatic diols, their corresponding phenates. If necessary, this diol may be recovered by solvent extraction techniques, fractional distillation, etc. Alternatively, the diol may be, in effect, salvaged by recycling the separated aqueous phase to another reaction medium. Of course, the salt should be at least partially removed and further alkaline material added to the recycled aqueous material.

The following example illustrates the manner in which the present invention may be practiced.

EXAMPLE I

Into a 3000 cubic centimeter flask 347 grams (1.5 moles) of diethylene glycol dichloroformate, 1000 milliliters of ethylene chloride and between 106 and 212 grams of diethylene glycol, depending upon the specific run and as given in Table I, were introduced. This flask was immersed in an ice bath whereby to maintain the temperature of the contents between 0° C. and 5° C. throughout the reaction period. An aqueous solution of sodium hydroxide containing 50 percent sodium hydroxide by weight was then sprayed into the mixture over a period of 4 hours and at a rate such that the temperature was kept between 0° C. and 5° C. until the caustic requirements of the reaction were introduced, see Table I. At the conclusion of the caustic addition, the reaction mixture which had been stirred throughout such addition was further stirred for a period of 16 hours as indicated in Table I. One run was made using 1 hour and 4 hours for the respective steps.

Thereafter, the polycarbonate was isolated by decanting the oil layer present in the reaction medium and extracting the remaining slurry with 100 cubic centimeters of ethylene chloride. Following this, the product layer was washed with water to neutrality, topped free of solvent under vacuum at 100° C., weighed and the hydroxyl number determined according to standard techniques.

In runs 1 and 2, prior to removing the solvent, the product layer was washed with dilute aqueous pyridine containing 1 percent by weight of pyridine.

Table I summarily provides the operational conditions and results obtained by following the above outlined procedure in a plurality of runs wherein the quantity of diethylene glycol was varied while the diethylene glycol dichloroformate reactant was maintained constant.

*Table I*

POLYGLYCOLCARBONATE PREPARATION FROM DIETYYLENE GLYCOL DICHLOROFORMATE-DIETHYLENE GLYCOL

[Basis: 1.5 moles diethylene glycol bis-chloroformate (347 g.), $C_2H_2Cl_2$ 1000 ml.]

| Run No. | Diethylene Glycol (Moles) | NaOH, Moles | Unreacted Chloroformate, Percent | Time (hours) Addition | Time (hours) Stirring | Yield (grams) | OH No. | Approximate Average Molecular Weight |
|---|---|---|---|---|---|---|---|---|
| 1 | 1.0 | 4.0 | 20 | 4 | 16 | 198 | 75 | 1,500 |
| 2 | 1.0 | 5.0 | 5 | 4 | 16 | 242 | 58 | 1,900 |
| 3 | 1.5 | 5.0 | 0 | 4 | 16 | 275 | 38 | 2,950 |
| 4 | 2.0 | 5.0 | 0 | 4 | 16 | 278 | 44 | 2,550 |
| 5 | 1.25 | 5.0 | 0 | 1 | 4 | 300 | 37 | 3,000 |
| 6 | 1.25 | 5.0 | 0 | 3-4 | 16 | 290 | 45 | 2,500 |

EXAMPLE II

Into a three liter, three necked glass flask was placed 350.0 grams (1.5 moles) of diethylene glycol bischloroformate, 132.6 grams (1.25 moles) of diethylene glycol and 1000 cubic centimeters of ethylene dichloride. While cooling the flask by immersion in an ice-water bath, 400 grams of aqueous sodium hydroxide containing 50 percent NaH by weight were sprayed into the flask over a one hour period. The contents of the flask were stirred during this period and the temperature was maintained at 25° C.–30° C. Stirring was continued for an additional 2½ hours at 27° C., after which the organic layer was separated from the aqueous phase.

Then the organic layer was filtered and the ethylene dichloride was removed by atmospheric distillation followed by vacuum distillation at 110° C. and 2.5 millimeters of mercury pressure for 15 minutes. A linear polycarbonate product weighing 286.6 grams having only terminal hydroxyl groups, a hydroxyl number of 60 and an average molecular weight of 1870 was provided.

EXAMPLE III

A mixture of 350.0 grams (1.5 moles) of diethylene glycol bis-chloroformate, 187.8 grams (1.25 moles) of triethylene glycol and one liter of ethylene dichloride was charged to a 3 liter, three-necked flask fitted with a stirrer, thermometer and sprayer. While stirring and cooling with an ice-salt bath, 400 grams of aqueous sodium hydroxide containing 50 percent NaOH by weight were sprayed into the mixture at a rate such that the temperature was kept below 5° C. for one hour. After stirring for an additional 90 minutes, the oil layer (an ethylene dichloride solution of product) was decanted and the other layer of salt sludge was washed with two 100 milliliter portions of ethylene dichloride.

The combined ethylene dichloride solutions were washed first with 500 milliliters of aqueous sodium hydroxide containing 5 percent NaOH by weight and one percent pyridine by weight, then with 500 milliliters of 5 percent hydrochloric acid and finally with 500 milliliters of water.

The washed material was distilled to remove the ethylene dichloride and water. Ultimately, the residue was heated to 110° C. for 30 minutes at a pressure of 2 millimeters' mercury. The residue was then filtered through a steam jacketed, fritted glass funnel and bed of Decalite to give a viscous linear polycarbonate having only terminal hydroxyl groups and a hydroxyl number of 20.

EXAMPLE IV

Into a three liter, glass flask 350.0 grams (1.5 moles) of diethylene glycol bis-chloroformate, 77.5 grams (1.25 moles) of ethylene glycol and one liter of ethylene dichloride were charged. After cooling to 0° C., and while agitating, 400 grams (5.0 moles of NaOH) of aqueous sodium hydroxide containing 50 percent NaOH by weight were sprayed into the mixture over the course of an hour. The temperature was maintained at from 0° C. to 5° C. during the addition. With continued stirring, the mixture was then allowed to gradually warm to room temperature.

Thereafter, the mixture was settled and the ethylene dichloride layer was decanted. The remaining salt sludge was twice washed with 100 milliliters of ethylene dichloride and the washings were combined with the decanted ethylene dichloride. This material was sequentially washed with 500 milliliters of a solution containing 5 percent NaOH by weight and one percent by weight pyridine, with 500 milliliters of 5 percent by weight hydrochloric acid solution and then with 500 milliliters of water.

The thusly washed material was treated to remove ethylene dichloride by distillation. Ultimately the residue was heated to 100° C. at a pressure of 2 millimeters' mercury for 15 minutes. This left behind as residue, a linear polycarbonate having terminal hydroxyl groups and a hydroxyl number of 71–72.

By replacing a portion of the ethylene glycol used in Example IV with an equimolecular quantity of propylene glycol, a mixed polycarbonate is provided. If a portion of the bis-chloroformate of diethylene glycol is replaced with dipropylene glycol bis-chloroformate a mixed polycarbonate is also produced.

EXAMPLE V

In lieu of the ethylene glycol used in Example IV, an equimolecular amount of 3-butenediol-1,2 is used. A high molecular weight polycarbonate is formed which contains olefinic unsaturation. A catalytic quantity of benzoyl peroxide is added to the ethylene dichloride solution. Thereafter, the ethylene dichloride is removed by simple distillation and the polycarbonate further polymerized by heating at 70° C. This further polymerization is conducted in a mold thereby yielding a shaped article.

EXAMPLE VI

Bis-chloroformate of ethylene glycol in the amount of 1.1 moles was added to an agitated mixture of 1.0 mole of 4,4'-dihydroxy-diphenyl-2,2-propane (Bisphenol A), an aqueous sodium hydroxide solution containing 10 weight percent NaOH and 2.4 moles of NaOH and 900 milliliters of methylene chloride maintained at 20° C. over the course of one hour. Agitation by stirring was continued for 20 hours.

Thereafter, the organic methylene chloride layer was phase separated and water washed. After drying with magnesium sulfate, the organic layer still contained unreacted chloroformate. Additional washing with a dilute aqueous solution of pyridine-sodium hydroxide removed the residual chloroformate content, and completed the reaction.

The methylene chloride was removed by evaporation and finally by evacuation of the residue in a desiccator. A white, brittle, readily pulverizable high molecular weight polycarbonate product was obtained.

EXAMPLE VII

A solution of 32 grams (0.81 mole) of sodium hydroxide in 320 milliliters of water was added to 36.7 grams (0.333 mole) of resorcinol. This solution was cooled to 15° C. and 300 milliliters of methylene chloride was added. To the resulting vigorously agitated heterogeneous reaction medium at 15° C. to 20° C., 68.5 grams (0.366 mole) of bis-chloroformate of ethylene glycol was added over a one hour period.

From this reaction medium, a high molecular weight polycarbonate was recovered.

EXAMPLE VIII 47.9 grams (0.21 mole) of Bisphenol A was added with stirring to a mixture of 50 grams of aqueous sodium hydroxide solution containing 49 weight percent NaOH and 60 milliliters of methylene chloride. Over a one hour period and while the reaction medium was at 25° C. to 30° C. and well agitated, a solution of 89.5 grams (0.25 mole) of the bis-chloroformate by Bisphenol A in 150 milliliters of methylene chloride was added. After standing for 14 hours, some chloroformate was still present. This was removed by washing the phase separated organic phase with dilute pyridine-sodium hydroxide solution followed by dilute hydrochloric acid and water washes. This solvent layer was dried over sodium sulfate. Evaporation of the methylene chloride yielded a tough, light colored, high molecular weight polycarbonate.

Exceptionally strong heat resistant films were prepared from the methylene chloride solution.

EXAMPLE IX

A five liter flask was charged with 2100 milliliters of water, 5.28 moles of sodium hydroxide, 1.805 moles of Bisphenol A and 0.004 mole of phenol. To this mixture at 25° C. and while it was being well stirred, 1350 milliliters of methylene chloride was added under a nitrogen atmosphere. Thereafter, 2.2 moles of phosgene was passed in 3.5 hours into the mixture maintained at 25° C.

To this phosgenated mixture an aqueous 60 percent by weight solution of trimethylbenzyl ammonium chloride containing 0.0485 mole thereof was added. After stirring, the separated organic phase was diluted with methylene chloride, water washed and dried over anhydrous magnesium sulfate. Methylene chloride was then removed by evaporation, leaving as residue a tough, almost colorless polycarbonate.

A small portion of this polycarbonate was molded at 200° C. and 2000 pounds per square inch. A yellow, translucent, tough solid molded product was obtained.

Films casted from the methylene chloride solution of the polycarbonate were colorless, clear and quite strong.

The polycarbonates herein provided may be considered to have the following repeating structure:

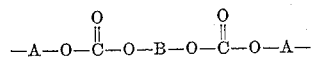

wherein A is the residue of the diol and B is the residue of the diol from which the dichloroformate was derived in the case of polycarbonates prepared from bis-chloroformates and diols. When A and B represent residues of acylic, saturated diols, e.g. ethylene glycol, the polycarbonates have hydroxyl numbers on the order of 20 to 100 and average molecular weights from 800 to 5000. When A and B are representative of other diol residues, the polycarbonates may be of different molecular weights, sometimes even considerably greater molecular weight.

Particularly desired polycarbonates provided by recourse to this invention are those wherein both A and B of the foregoing formula are the same, such as when the dichloroformate is derived from the identical diol with which it is reacted or when a diol is phosgenated. These polycarbonates presumably have the following general structure:

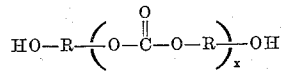

wherein R represents the residue of a diol and X designates the number of repeating units in the molecule. Depending on the particular diol from which R is derived, X may vary but generally is a whole integer from 5 to 50, even as high as 500. With diethylene glycol, X is suitably from 12 to 20.

Diols (hydroxylic compounds) which are reacted with the polychloroformates or other acid chlorides of a carbonic acid includes the saturated, acyclic dihydric alcohols, typical of which are ethylene glycol, propandiol-1,2, butandiol-1,3, butandiol-2,3, butandiol-1,2, butandiol-1,4, diethylene glycol, triethylene glycol, tetraethylene glycol, dipropylene glycol, tripropylene glycol, dibutylene glycol, tetrabutylene glycol and olefinically unsaturated dihydric alcohols such as 3-butenediol-1,2. Polyglycols containing from 1 to 4 ether linkages and/or up to 12 carbon atoms are included.

Other diols include polyhydroxy and notably dihydroxy benzenes including catechol, resorcinol, quinol, orcinol, mesorcinol, dihydroxyxylol, thymoquinol; naphthalene diols such as 1,3-dihydroxynaphthalene, 1,8-dihydroxynaphthalene, 2,7-dihydroxynaphthalene, 1,6-dihydroxynaphthalene; dihydroxydiphenyls such as 2,5-dihydroxydiphenyl, 2,2'-dihydroxydiphenyl, 2,4'-dihydroxydiphenyl, 3,3'-dihydroxydiphenyl, 4,4'-dihydroxydiphenyl, 3,4-dihydroxydiphenyl; aralkyl diols including xylylene glycols such as phthalyl alcohol, metaxylylene glycol, paraxylylene glycol, dimethylxylylene glycols such as alpha, alpha'-dihydroxydurene and styryl glycol; bishydroxydiphenyl-alkanes including Bisphenol A, 4,4'-dihydroxydiphenyl-methane, 4,4'-dihydroxydiphenyl-1,1-ethane, 4,4'-dihydroxydiphenyl cyclopentane, 4,4'-dihydroxy-3,3'-dichlorodiphenyl-2,2-propane, 4,4'-dihydroxydiphenyl-(2,2,2-trichloro)-1,1-ethane among others.

Cycloaliphatic diols such as 1,2-cyclohexanediol, 1,3-cyclohexanediol, 1,4-cyclohexanediol, 1-methyl-cyclohexanediol-2,3, 1,2-cyclopentanediol, 1,3-cyclopentanediol, 3,3'-dihydroxydicyclopentyl ether, hydrogenated bisphenols illustrated by 4,4'-dihydroxydicyclohexyl-2,2-propane and 1,2-dihydroxyl-4-vinylcyclohexane.

Suitable acid chlorides of a carbonic acid include phosgene and the bis-chlorocarbonates (dichloroformates) as are provided by phosgenating diols such as above described. United States Letters Patents 2,397,630 and 2,476,637 describe processes for conducting this phosgenation. The former patent describes the preparation of chloroformates of polyhydroxy compounds including the chloroformates of glycols and polyglycols such as ethylene glycol, diethylene glycol, triethylene glycol, tetraethylene glycol, propylene glycol, dipropylene glycol, trimethylene glycol, erythrol and other polyhydroxy compounds such as glycerol, polyglycerol, alpha methyl glycerol, phthalyl alcohol, hydroquinone, pyrogallol, Bisphenol A (isopropylidene bisphenol) and the like.

It is possible to prepare polycarbonates by using mixtures of diols. Thus, a mixture of diethylene glycol and triethylene glycol may be appropriately reacted with a dichloroformate such as diethylene glycol bis-chloroformate. Also within the contemplation of this invention is the use of a mixture of dichloroformates, each of which is derived from a diol. Or phosgene may be passed into a heterogeneous medium containing two or more different diols.

It should be further understood that although the dichloroformates are described in terms of the diol from which they are derived, these useful dichloroformates may be prepared by any process in lieu of the described phosgenation of diol.

As indicated, the polychloroformate may be derived from a diol other than the one with which it is reacted in providing the polycarbonates. Further it will be understood that polyhaloformates, such as polyiodo-, polybromo and polyfluoro chloroformates corresponding to the enumerated and intended polychloroformates are useful.

This application is a continuation-in-part of our copending prior application Serial No. 441,927, filed July 7, 1954, and now abandoned.

Although the invention has been described with reference to specific details of certain embodiments, it is not intended that it be construed as being limited thereto except insofar as they appear in the appended claims.

We claim:

1. A method of producing a high molecular weight polycarbonate which comprises reacting an acyclic, saturated diol and a dihaloformate of a diol in a heterogeneous medium containing an aqueous alkaline phase and an essentially water insoluble, inert organic solvent for the polycarbonate selected from the group consisting of nitroalkanes, dialkyl ethers and partially chlorinated aliphatic hydrocarbons.

2. A method of producing a high molecular weight polycarbonate which comprises reacting an acyclic, saturated diol and a dichloroformate of a diol in a heterogeneous medium containing an aqueous alkaline phase and a partially chlorinated aliphatic hydrocarbon.

3. A method of preparing a high molecular weight polycarbonate which comprises reacting diethylene glycol and diethylene glycol dichloroformate in a heterogeneous medium containing an aqueous alkaline phase and an essentially water insoluble, inert organic solvent for the polycarbonate selected from the group consisting of nitroalkanes, dialkyl ethers and partially chlorinated aliphatic hydrocarbons.

4. A method of preparing a high molecular weight polycarbonate which comprises reacting an acyclic, saturated diol and a dichloroformate of a diol in a heterogeneous medium containing an aqueous alkaline phase and a partially chlorinated aliphatic hydrocarbon, and maintaining the reaction temperature above the freezing point of the medium but below about 70° C.

5. A method of preparing a high molecular weight polycarbonate which comprises reacting diethylene glycol and diethylene glycol dichloroformate in a heterogeneous medium containing an aqueous solution of an alkali metal hydroxide and a partially chlorinated aliphatic hydrocarbon, and maintaining the temperature of said medium between about minus 10° and plus 40° C.

6. A method of preparing a high molecular weight polycarbonate which comprises reacting an acyclic, saturated diol and a dichloroformate of an acyclic, saturated diol in a heterogeneous medium containing an aqueous solution of sodium hydroxide and a partially chlorinated aliphatic hydrocarbon which is a solvent for the polycarbonate being produced, maintaining the temperature of said medium above the freezing point thereof and below about 50° C., and recovering the polycarbonate thusly formed.

7. A method of preparing a high molecular weight polycarbonate which comprises reacting an acyclic, saturated diol and a dichloroformate in a heterogeneous medium comprising an aqueous alkaline phase and a partially chlorinated aliphatic hydrocarbon which is a solvent for the polycarbonate, said aqueous alkaline phase being an aqueous solution of sodium hydroxide containing between 2 to 6 moles of sodium hydroxide per mole of chloroformate undergoing reaction.

8. A method of preparing a high molecular weight polycarbonate which comprises reacting an acyclic, saturated diol and an acyclic, saturated dichloroformate in a heterogeneous liquid medium containing aqueous alkaline phase and an essentially water insoluble, inert organic solvent for the polycarbonate selected from the group consisting of nitroalkanes, dialkyl ethers and partially chlorinated aliphatic hydrocarbons, separating the resulting organic phase at the conclusion of the reaction and recovering the polycarbonate from the separated organic phase.

9. A method of preparing a high molecular weight polycarbonate which comprises reacting ethylene glycol and the dichloroformate of diethylene glycol in a heterogeneous liquid medium containing an aqueous alkaline phase and an essentially water insoluble, inert organic solvent for the polycarbonate selected from the group consisting of nitroalkanes, dialkyl ethers and partially chlorinated aliphatic hydrocarbons, maintaining the temperature of the medium below about 70° C., separating the organic phase present at the conclusion of the reaction and recovering the polycarbonate from said separated organic phase.

10. The method of claim 9 wherein the separated organic phase is washed with an aqueous media prior to the recovery of the polycarbonate.

11. A method of preparing a high molecular weight polycarbonate which comprises at least two acyclic, saturated diols with a dihaloformate in a liquid medium containing an aqueous alkaline phase and an essentially water insoluble, inert organic solvent for the polycarbonate selected from the group consisting of nitroalkanes, dialkyl ethers and partially chlorinated aliphatic hydrocarbons.

12. A method of preparing a high molecular weight polycarbonate which comprises reacting an acyclic, saturated diol with at least two dihaloformates in a liquid medium containing an aqueous alkaline phase and an essentially water insoluble, inert organic solvent for the polycarbonate selected from the group consisting of nitroalkanes, dialkyl ethers and partially chlorinated aliphatic hydrocarbons.

References Cited in the file of this patent

UNITED STATES PATENTS

| | | |
|---|---|---|
| 2,379,250 | Muskat et al. | June 26, 1945 |
| 2,403,113 | Muskat et al. | July 2, 1946 |
| 2,476,637 | Strain et al. | July 19, 1949 |
| 2,517,965 | Bohl | Aug. 8, 1950 |
| 2,658,886 | Swerdloff et al. | Nov. 10, 1953 |

(Other references on following page)

UNITED STATES PATENTS 2,708,617 Magat et al. _____ May 17, 1955

FOREIGN PATENTS 532,543 Belgium _____ Oct. 30, 1954
546,375 Belgium _____ Mar. 23, 1956
772,627 Great Britain _____ Apr. 17, 1957

OTHER REFERENCES

Schnell: "Angewandte Chemie," vol. 68, No. 20, pages 633–640 (October 21, 1956).

Schnell: German application Ser. No. F 13,040, printed June 21, 1956.

Strain et al.: Abandoned application Serial No. 441,927, filed July 7, 1954, abandoned June 21, 1957.